United States Patent
Sawai et al.

(10) Patent No.: US 10,598,312 B2
(45) Date of Patent: Mar. 24, 2020

(54) CONNECTION STRUCTURE FOR PRESSURE VESSELS, TANK MODULE INCLUDING THE SAME, AND MANUFACTURING METHOD OF TANK MODULE

(71) Applicant: TOYOTA JIDOSHA KABUSHIKI KAISHA, Toyota (JP)

(72) Inventors: Osamu Sawai, Okazaki (JP); Yuki Kai, Nisshin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 81 days.

(21) Appl. No.: 16/046,231

(22) Filed: Jul. 26, 2018

(65) Prior Publication Data

US 2019/0049070 A1 Feb. 14, 2019

(30) Foreign Application Priority Data

Aug. 10, 2017 (JP) .................... 2017-154878

(51) Int. Cl.
*F17C 13/08* (2006.01)
*F17C 13/00* (2006.01)
(Continued)

(52) U.S. Cl.
CPC ............... *F17C 13/08* (2013.01); *F17C 1/00* (2013.01); *F17C 13/002* (2013.01); *B60K 15/03* (2013.01);
(Continued)

(58) Field of Classification Search
CPC .......... F17C 13/08; F17C 13/002; F17C 1/00; Y10T 137/4673; Y10T 137/474;
(Continued)

(56) References Cited

U.S. PATENT DOCUMENTS 6,206,027 B1 3/2001 Ponnet et al.
6,883,536 B2 * 4/2005 Hervio et al. ............ F17C 1/02
137/259
(Continued)

FOREIGN PATENT DOCUMENTS

| JP | 2001-506737 | 5/2001 |
| JP | 2002-188794 | 7/2002 |
| JP | 2018-112201 | 7/2018 |

OTHER PUBLICATIONS

"Industrial Tube Fittings", Parker, FluidConnectors, Catalog 4300, Sep. 2000, pp. C34,I26 and cover pages.

Primary Examiner — Kevin L Lee
(74) Attorney, Agent, or Firm — Oblon, McClelland, Maier & Neustadt, L.L.P.

(57) ABSTRACT

A connection structure for pressure vessels is configured such that respective mouth pieces are connected to at least one ends of the pressure vessels, and when adjacent mouth pieces are connected to each other in an intersection direction intersecting with the axial direction, the pressure vessels placed in parallel can be connected to each other. The mouth piece includes a connecting portion along the intersection direction intersecting with the axial direction. The connecting portion includes an external screw thread portion formed on a first side thereof, and a nut rotatably locked to a second side thereof and having an internal screw thread portion threadedly engageable with the external screw thread portion.

6 Claims, 7 Drawing Sheets

(51) Int. Cl.
*F17C 1/00* (2006.01)
*B60K 15/03* (2006.01)
*B60L 58/30* (2019.01)

(52) U.S. Cl.
CPC .............. *B60K 2015/03032* (2013.01); *B60K 2015/03144* (2013.01); *B60K 2015/03315* (2013.01); *B60L 58/30* (2019.02); *F17C 2201/035* (2013.01); *F17C 2201/056* (2013.01); *F17C 2203/012* (2013.01); *F17C 2203/0604* (2013.01); *F17C 2203/0619* (2013.01); *F17C 2203/0629* (2013.01); *F17C 2203/0646* (2013.01); *F17C 2203/0648* (2013.01); *F17C 2203/0663* (2013.01); *F17C 2205/0142* (2013.01); *F17C 2205/0146* (2013.01); *F17C 2221/012* (2013.01); *F17C 2223/0123* (2013.01); *F17C 2223/036* (2013.01); *F17C 2225/013* (2013.01); *F17C 2270/0168* (2013.01); *F17C 2270/0184* (2013.01); *Y10T 137/4673* (2015.04)

(58) Field of Classification Search
CPC ......... Y10T 137/4841; Y10T 137/4807; Y10T 137/4857
See application file for complete search history.

(56) References Cited

U.S. PATENT DOCUMENTS

| | | | |
|---|---|---|---|
| 2002/0088806 A1 | 7/2002 | Takaku et al. | |
| 2013/0092561 A1 | 4/2013 | Wellnitz | |
| 2017/0067602 A1* | 3/2017 | Cola et al. | F17C 13/08 |
| 2018/0283611 A1* | 10/2018 | Bernard et al. | F17C 1/06 |

* cited by examiner

CONNECTION STRUCTURE FOR PRESSURE VESSELS, TANK MODULE INCLUDING THE SAME, AND MANUFACTURING METHOD OF TANK MODULE

INCORPORATION BY REFERENCE

The disclosure of Japanese Patent Application No. 2017-154878 filed on Aug. 10, 2017 including the specification, drawings and abstract is incorporated herein by reference in its entirety.

BACKGROUND

1. Technical Field

The disclosure relates to a connection structure for pressure vessels, a tank module including the same, and a manufacturing method of a tank module.

2. Description of Related Art

As a pressure vessel to be mounted on a vehicle, there has been known a pressure vessel filled with hydrogen gas as described in Japanese Unexamined Patent Application Publication No. 2002-188794 (JP 2002-188794 A). Here, when the pressure vessel described in JP 2002-188794 A is reduced in diameter so as to place a plurality of pressure vessels, it is possible to improve a degree of freedom of mounting of the pressure vessels on a vehicle. For example, in Japanese Unexamined Patent Application Publication (Translation of PCT Application) No. 2001-506737 (JP 2001-506737 A), a plurality of pressure vessels (tubes) connected via a manifold is placed along the shape of a vehicle.

In the meantime, when the pressure vessels are connected to the manifold, the pressure vessels placed in parallel may have different attachment angles (an angle may be formed between the pressure vessels placed in parallel). Particularly, when the pressure vessels are long, a large difference in distance occurs between their ends on the side that does not face the manifold. Accordingly, there is room for improvement in a structure for connecting a plurality of pressure vessels placed in parallel.

SUMMARY

The disclosure provides a connection structure for connecting a plurality of pressure vessels placed in parallel, the connection structure being able to eliminate an error in attachment angle between the pressure vessels at the time when the pressure vessels are connected to each other.

A first aspect of the present disclosure relates to a connection structure for pressure vessels. The connection structure includes: a first mouth piece connected to at least one end of a tubular first pressure vessel in an axial direction; a second mouth piece connected to at least one end of a tubular second pressure vessel in the axial direction; and a nut. The first mouth piece includes a first penetration passage extending in an intersection direction intersecting with the axial direction, and a first communicating passage configured to connect the first penetration passage to an inside of a first body portion of the first pressure vessel. The second mouth piece includes a second penetration passage extending in the intersection direction intersecting with the axial direction, and a second communicating passage configured to connect the second penetration passage to an inside of a second body portion of the second pressure vessel. The first mouth piece includes an external screw thread portion provided on a first outer wall portion of the first penetration passage. The nut is rotatably locked to a second outer wall portion of the second penetration passage of the second mouth piece and is threadedly engaged with the external screw thread portion of the first mouth piece so as to connect the first mouth piece and the second mouth piece to each other in the intersection direction.

The connection structure is applied to connection of a plurality of pressure vessels. Respective mouth pieces are connected to at least one ends of the pressure vessels in the axial direction, and when adjacent mouth pieces are connected to each other in the intersection direction intersecting with the axial direction, the pressure vessels are connected to each other. Here, the "intersection direction" is not limited to a direction perpendicular to the axial direction, but also includes a direction inclined diagonally. The first mouth piece includes the first penetration passage extending in the intersection direction, the second mouth piece includes the second penetration passage extending in the intersection direction, and the external screw thread portion provided on the first outer wall portion of the first penetration passage of the first mouth piece is formed so as to be threadedly engageable with an internal screw thread portion provided on the second outer wall portion of the second penetration passage of the second mouth piece. The internal screw thread portion is provided in the nut rotatably locked to the connecting portion that connects the first mouth piece and the second mouth piece to each other. With the connection structure, the pressure vessels placed in parallel to each other can be connected to each other, and piping can be also performed. Since the nut having the internal screw thread portion is formed so as to be rotatable independently from the connecting portion, it is possible to eliminate an error in attachment angle between the pressure vessels.

The first mouth pieces may be connected to both ends of the first body portion of the first pressure vessel. The second mouth pieces may be connected to both ends of the second body portion of the second pressure vessel.

With the connection structure, it is possible to connect adjacent mouth pieces to each other at the opposite ends of the pressure vessels in the axial direction.

A sealing member surrounding the first penetration passage may be provided on an abutting surface between the first mouth piece and the second mouth piece.

Due to the sealing member provided between an end surface of the first mouth piece and an end surface, of the second mouth piece, that faces the end surface of the first mouth piece, when the first and second mouth pieces adjacent to each other are connected, it is possible to adjust the angle at the time when the pressure vessels are connected and to secure the airtightness between the connecting portions of the pressure vessels.

The first mouth piece may include a first tapered surface provided around the first penetration passage of the first mouth piece. The second mouth piece may include a second tapered surface provided around the second penetration passage of the second mouth piece so as to abut with the first tapered surface.

In the connection structure, when the first and second mouth pieces adjacent to each other are connected, the tapered surfaces abut with each other. Accordingly, it is possible to adjust the angle at the time when the pressure vessels are connected and to secure the airtightness between the connecting portions of the pressure vessels.

A second aspect of the disclosure relates to a tank module including the connection structure for pressure vessels.

In the tank module, the pressure vessels placed in parallel are configured such that adjacent mouth pieces are connected continuously. With the tank module, it is possible to achieve assembling and piping of the tank module without using a large and complicated component such as a manifold.

A third aspect of the disclosure relates to a manufacturing method of the tank module, and the manufacturing method includes: a process of connecting the first mouth piece to the first body portion of the first pressure vessel; a process of connecting the second mouth piece to the second body portion of the second pressure vessel placed in parallel with the first pressure vessel; and a process of connecting the first mouth piece to the second mouth piece.

In the manufacturing method, the tank module is manufactured by forming a plurality of pressure vessels in the above first process, and then connecting a necessary number of pressure vessels for the tank module in its subsequent process. With the manufacturing method, the pressure vessels formed in advance in the first process can be stocked, and then, a necessary number of pressure vessels for the tank module can be connected in the subsequent process. That is, it is possible to deal with manufacture of a plurality of tank modules with different numbers of pressure vessels and different arrangements thereof.

The disclosure can provide a connection structure for connecting a plurality of pressure vessels placed in parallel, the connection structure being able to eliminate an error in attachment angle between the pressure vessels at the time when the pressure vessels are connected to each other.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes a connection structure for pressure vessels according to each embodiment of the disclosure. Note that, in each drawing, an arrow FR indicates the front side in the vehicle front-rear direction, an arrow UP indicates the upper side in the vehicle up-down direction, an arrow LH indicates the left side in the vehicle right-left direction, and an arrow RH indicates the right side in the vehicle right-left direction. Further, a direction that connects the left side to the right side in the vehicle right-left direction is referred to as the vehicle width direction.

First Embodiment

A connection structure 14 for pressure vessels according to the first embodiment will be described with reference to FIGS. 1A to 3.

Basic Configuration

Figure 1A:
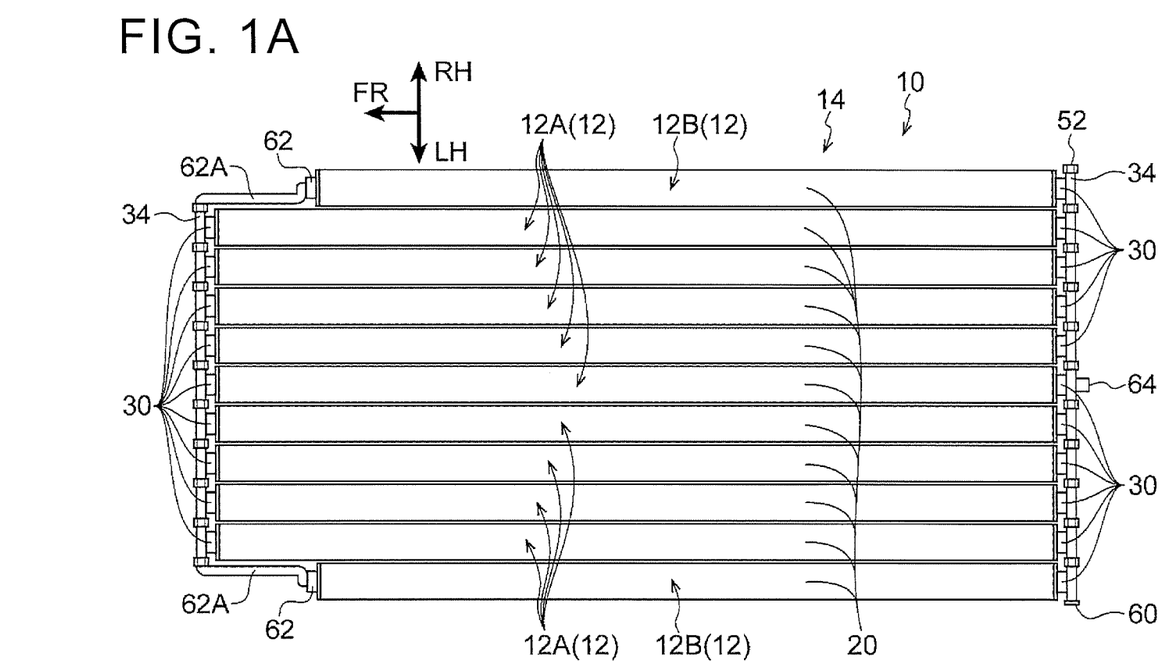
FIG. 1A is a plan view of a tank module according to a first embodiment of the disclosure.
Figure 1B:
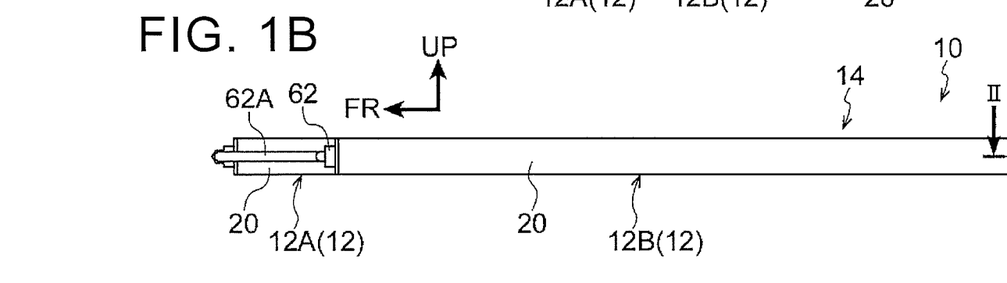
FIG. 1B is a side view of the tank module according to the first embodiment of the disclosure.
Figure 1C:
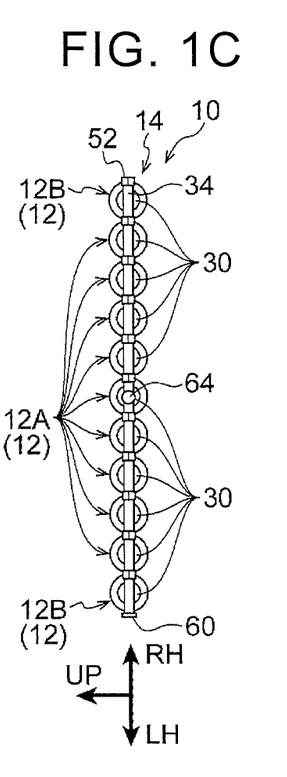
FIG. 1C is a rear view of the tank module according to the first embodiment of the disclosure.

As illustrated in FIGS. 1A to 1C, a tank module 10 to which the connection structure 14 for pressure vessels according to the present embodiment is applied is provided with a plurality of pressure vessels 12 and configured such that the pressure vessels 12 are connected to each other. More specifically, the pressure vessels 12 include first pressure vessels 12A, and second pressure vessels 12B having an axial length shorter than that of the first pressure vessels 12A. The tank module 10 is constituted by nine first pressure vessels 12A placed in parallel on the inner side in the vehicle width direction, and second pressure vessels 12B placed outward of the first pressure vessels 12A in the vehicle width direction. The tank module 10 is placed on the lower side of a floor panel (not shown) of a fuel cell vehicle in the vehicle up-down direction, as an example.

Figure 2:
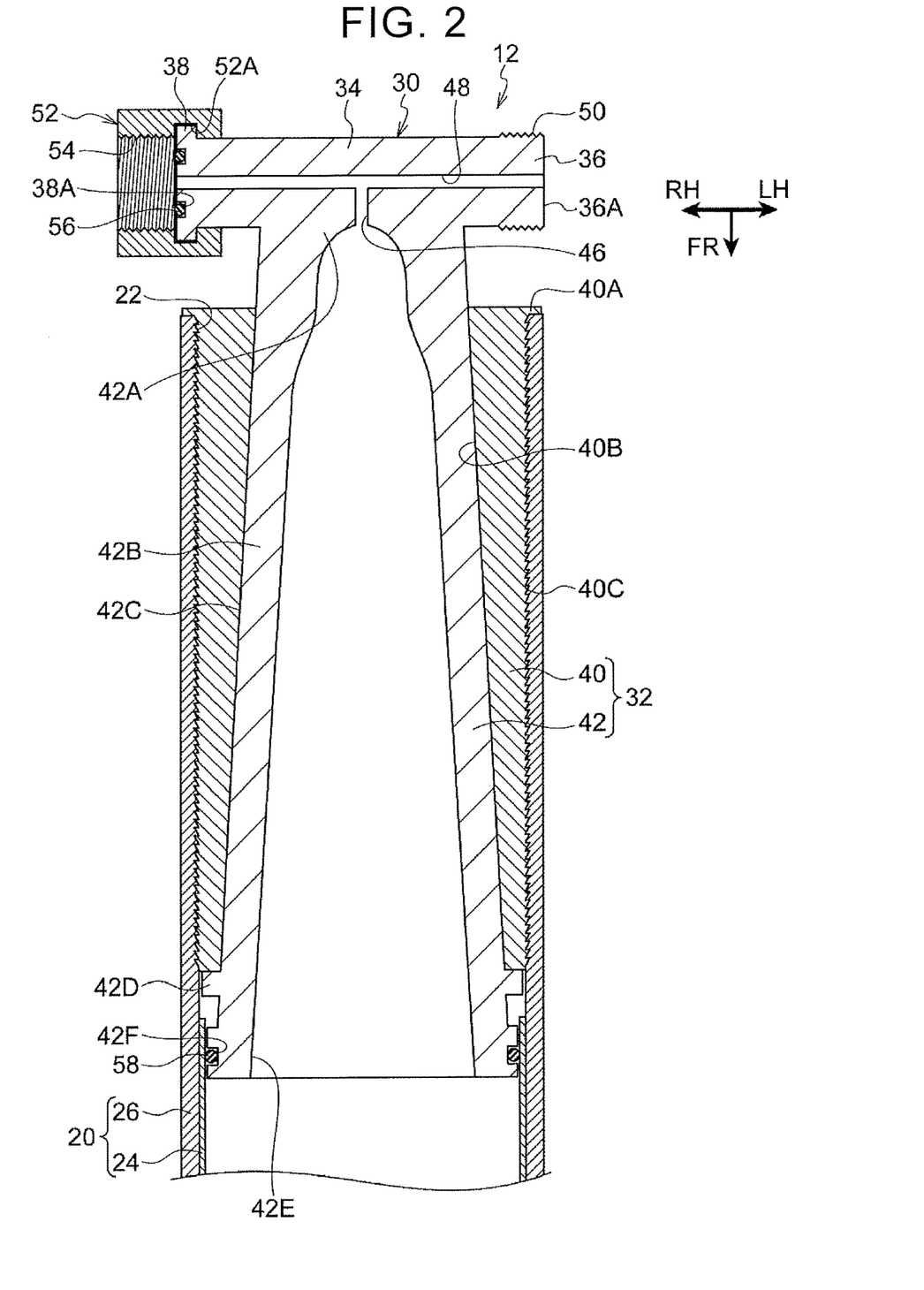
FIG. 2 is a sectional view (a sectional view taken along a line II-II in FIG. 1B) of a mouth piece in a connection structure for pressure vessels according to the first embodiment of the disclosure.

The pressure vessel 12 is formed in a pillar shape with its axial direction (the longitudinal direction) being along the vehicle front-rear direction. As illustrated in FIG. 2, the pressure vessel 12 is constituted by a body portion 20 formed in a cylindrical shape, and mouth pieces 30 respectively connected to openings 22 provided on the opposite ends of the body portion 20 in the axial direction. The body portion 20 includes a cylindrical liner 24 made of aluminum alloy, for example, and a reinforcing member 26 formed by winding a sheet-shaped CFRP (carbon fiber reinforced resin) around the outer peripheral surface of the liner 24. Note that carbon fibers (not shown) in the fiber reinforced resin are aligned, along the circumferential direction of the liner 24, eventually, the body portion 20, on the inner peripheral surface of the reinforcing member 26. Further, in a part, of the reinforcing member 26, other than the inner peripheral surface, carbon fibers are aligned along the circumferential direction of the liner 24, and carbon fibers with the half amount of the carbon fibers thus aligned in the circumferential direction are aligned so as to cross the axial direction. Further, the opposite outer ends of the reinforcing member 26 in the axial direction project outwardly in the axial direction from the opposite outer ends of the liner 24 in the axial direction.

The mouth piece 30 includes an insertion portion 32 to be inserted into the opening 22 provided in the body portion 20, and a connecting portion 34 provided outwardly in the axial direction from the insertion portion 32. The insertion portion 32 is inserted into the body portion 20, and the connecting portion 34 is provided outside the body portion 20 in the axial direction. The connecting portion 34 extends in the vehicle width direction crossing the axial direction and is formed so as to be connectable to the connecting portion 34 of an adjacent mouth piece 30 in the vehicle width direction. Further, the mouth piece 30 includes a penetration passage 48 penetrating through the connecting portion 34 in the vehicle width direction, and a communicating passage 46 penetrating through the insertion portion 32 in the axial direction and configured to connect the penetration passage 48 to the inside of the body portion 20.

The insertion portion 32 includes a projection holding portion 40, and a pressure receiving portion 42. The projection holding portion 40 is formed in a generally cylindrical shape and is formed in combination of four generally wedge-shaped elements placed along the circumferential direction of the body portion 20. In other words, the projection holding portion 40 is divided into four parts by dividing lines (not shown) extending generally along the axial direction. A flange 40A projecting radially outwardly is formed in an outer end of the projection holding portion 40 in the axial direction. Further, the inner peripheral surface of the projection holding portion 40 is formed as a tapered surface 40B reduced in diameter as it goes outwardly in the axial direction.

A serrate portion 40C constituted by a plurality of saw teeth is formed on the outer peripheral surface of the projection holding portion 40. The serrate portion 40C is formed continuously along the circumferential direction of the projection holding portion 40. Each of the saw teeth is configured such that its axial outer surface (an outer surface of each saw tooth in the axial direction of a pressure vessel) is perpendicular to the axial direction and its axial inner surface is inclined radially inwardly as it goes inwardly in the axial direction. The inclination angle of a tip end constituted by the axial outer surface of the saw tooth and the axial inner surface thereof is an acute angle.

The pressure receiving portion 42 is inserted into the projection holding portion 40. The pressure receiving portion 42 is formed in a generally cylindrical shape and is configured such that a side wall portion 42B is elastically deformable inwardly generally along the radial direction around a top portion 42A placed on the outer side in the axial direction. The outer peripheral surface of the side wall portion 42B is formed as a tapered surface 42C reduced in diameter as it goes outwardly in the axial direction. The tapered surface 42C is brought into contact with the tapered surface 40B of the projection holding portion 40. Further, a projecting portion 42D projecting radially outwardly is formed on the outer peripheral surface of an axial inner part of the side wall portion 42B, and an axial inner end surface of the projection holding portion 40 is brought into contact with an axial outer surface of the projecting portion 42D. Further, an opening 42E of the pressure receiving portion 42 communicates with the inside of the body portion 20. That is, a fluid inside the body portion 20 flows into the pressure receiving portion 42 and the side wall portion 42B is displaceable generally radially outwardly due to the pressure of the fluid. Further, a groove 42F is formed, along the circumferential direction, in the vicinity of an axial inner end of the pressure receiving portion 42. An O-ring 58 as an elastic body is accommodated in the groove 42F.

Further, the connecting portion 34 includes a tube portion 36 having a tubular shape and provided in a first end of the connecting portion 34 in the vehicle width direction, and a flange portion 38 provided in a second end thereof in the vehicle width direction. The tube portion 36 and the flange portion 38 constitute wall portions of the penetration passage 48. An external screw thread portion 50 is formed in an end of the tube portion 36 as an outer wall portion for the penetration passage 48 of a first one of adjacent mouth pieces 30. Further, a nut 52 is rotatably locked to the flange portion 38 as an outer wall portion for the penetration passage 48 of a second one of the adjacent mouth pieces 30. More specifically, the flange portion 38 is fitted to a groove 52A provided on the inner peripheral surface of the nut 52. While the nut 52 is rotatable around the vehicle width direction, its movement in the vehicle width direction is restricted. An internal screw thread portion 54 threadedly engageable with the external screw thread portion 50 is formed in the nut 52.

Figure 3:
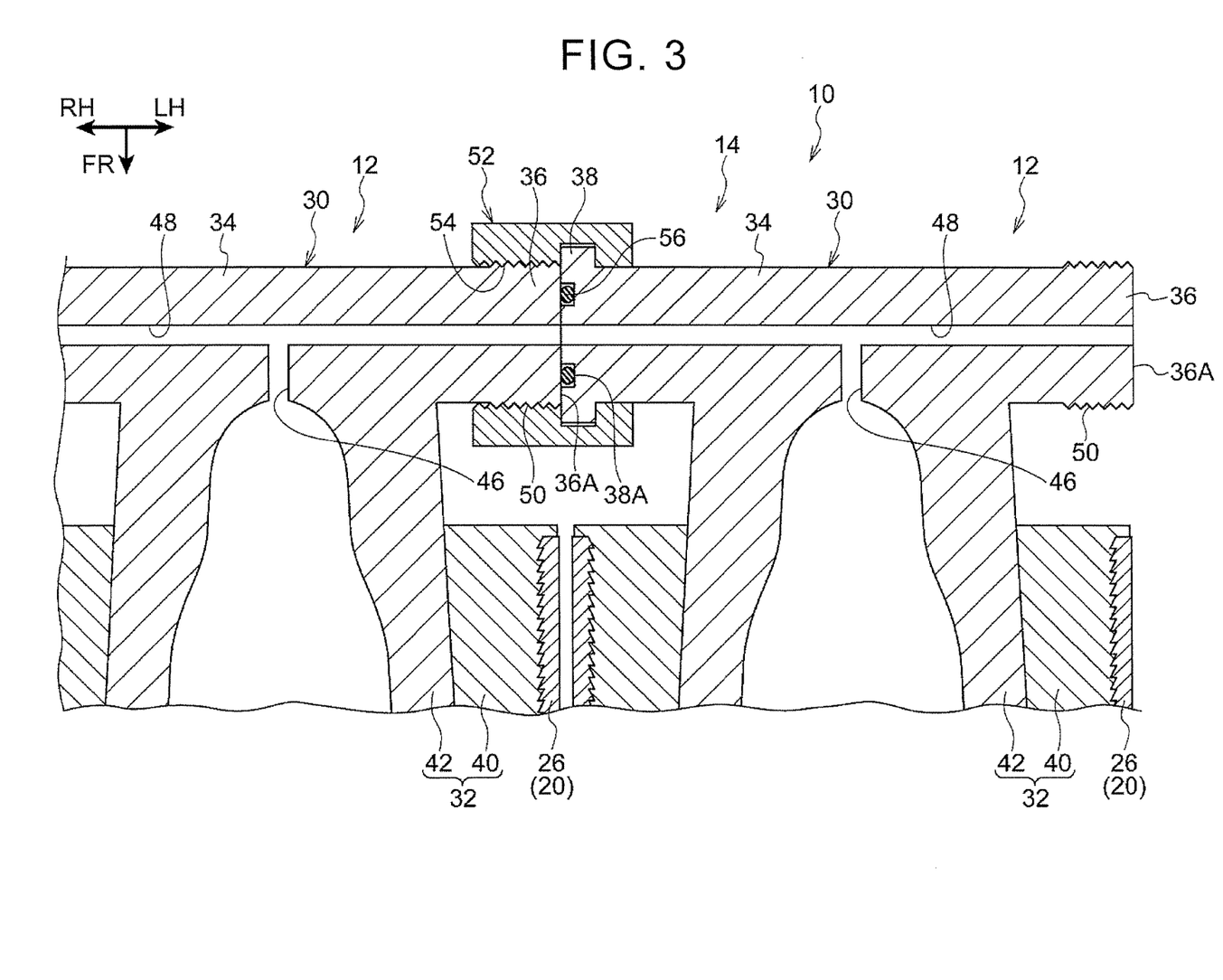
FIG. 3 is a sectional view illustrating a state where adjacent mouth pieces are connected to each other in the connection structure for pressure vessels according to the first embodiment of the disclosure.

As illustrated in FIG. 3, one pressure vessel 12 is configured such that the nut 52 of its adjacent pressure vessel 12 is fastened to the tube portion 36 provided in the mouth piece 30 of the one pressure vessel 12. That is, the pressure vessels 12 placed in parallel are connected to each other such that the external screw thread portion 50 of one pressure vessel 12 is threadedly engaged with the internal screw thread portion 54 formed in the nut 52 of its adjacent pressure vessel 12. At this time, in the pressure vessels 12 thus adjacent to each other, their penetration passages 48 are connected in series. Further, the airtightness between the connecting portions of the pressure vessels 12 is maintained by the O-ring 56 as a sealing member made of an elastic body. Here, the O-ring 56 is provided on an end surface (in the present embodiment, an end surface on the flange portion 38 side) of the connecting portion 34 of a first one of adjacent mouth pieces 30, so as to surround the penetration passage 48. The O-ring 56 is fitted to an annular groove 38A provided on the end surface on the flange portion 38 side. In the meantime, an abutment portion 36A facing the first one of the adjacent mouth pieces 30 is provided in the connecting portion 34 of a second one of the adjacent mouth pieces 30. The abutment portion 36A is a part with which the O-ring 56 abuts. In the present embodiment, the O-ring 56 is provided on the end surface on the flange portion 38 side. However, the present embodiment is not limited to this, and the O-ring 56 may be provided on an end surface (the abutment portion 36A) on the tube portion 36 side.

In the present embodiment, as illustrated in FIGS. 1A and 1B, the mouth pieces 30 are provided on the opposite ends of each of the pressure vessels 12 in the axial direction, so that adjacent pressure vessels 12 are connected to each other at their opposite ends in the axial direction. Here, in the tank module 10 of the present embodiment, the axial length of the second pressure vessels 12B placed on the outer sides in the vehicle width direction is shorter than that of the nine first pressure vessels 12A placed on the inner side in the vehicle width direction. Accordingly, the second pressure vessel 12B and the first pressure vessel 12A placed adjacently thereto are connected to each other via the mouth piece 30 on the rear side in the vehicle front-rear direction, but are connected to each other, on the front side in the vehicle front-rear direction, via a mouth piece 62 having an extending portion 62A extending in the axial direction. In the present embodiment, the tank module 10 is constituted in combination of the pressure vessels 12 having different lengths, but the tank module 10 may be constituted only by the pressure vessels 12 having the same length. In this case, the mouth piece 62 is not required.

Further, in the tank module 10 of the present embodiment, a valve 64 is provided in the mouth piece 30 provided on the rear side, in the vehicle front-rear direction, of the first pressure vessel 12A placed in the center in the vehicle width direction. The valve 64 is configured to extract the fluid from the pressure vessels 12 of the tank module 10 and to control the flow rate of the fluid. The valve 64 is connected to a fuel cell stack, a supply pipe, and the like (not shown).

Manufacture of Tank Module

The tank module 10 of the present embodiment is manufactured roughly by two steps. A first step is a step of connecting the mouth pieces 30 to the openings 22 on the opposite ends of the body portion 20 in the axial direction, that is, a step of forming the pressure vessel 12. More specifically, respective insertion portions 32 of the mouth pieces 30 are inserted into respective openings 22 on the opposite ends in the axial direction. Here, at the time of the insertion of the insertion portions 32, the axial outer surface of the projecting portion 42D is distanced from the axial inner end surface of the projection holding portion 40. Accordingly, the projection holding portion 40 is placed radially inwardly in comparison with the case where the axial outer surface of the projecting portion 42D is brought into contact with the axial inner end surface of the projection holding portion 40 (see FIG. 2). Accordingly, the outside diameter of the insertion portion 32 is smaller than the inside diameter of the opening 22, so that the insertion portion 32 can be inserted into the body portion 20. The flange 40A provided on the outer end of the projection holding portion 40 in the axial direction abuts with the end surface of the reinforcing member 26 of the sheet-shaped CFRP (carbon fiber reinforced resin), so that further movement of the projection holding portion 40 into the body portion 20 is restricted. In the meantime, as illustrated in FIG. 2, the liner 24 is not provided in an outer portion, in the axial direction, of the body portion 20 into which the insertion portion 32 is inserted, so that the projection holding portion 40 of the insertion portion 32 faces the reinforcing member 26.

When the pressure receiving portion 42 is moved outwardly in the axial direction from the projection holding portion 40 after the insertion portion 32 is inserted into the body portion 20, the pressure receiving portion 42 moves in a direction where the tapered surface 42C is increased in diameter relative to the tapered surface 40B, so that the projection holding portion 40 is displaced radially outwardly. As a result, the serrate portion 40C of the projection holding portion 40 cuts into the inner peripheral surface of the reinforcing member 26 as illustrated in FIG. 2. Hereby, the mouth piece 30 is fixed to the body portion 20, so that they are connected to each other. Note that a tip end in the serrate portion 40C cuts into a part between a carbon fiber and its adjacent carbon fiber on the inner peripheral surface of the reinforcing member 26.

Further, the projection holding portion 40 of the mouth piece 30 is displaceable outwardly in the radial direction of the body portion 20 upon receipt of the pressure from the inside of the body portion 20. Accordingly, the higher the pressure of the fluid accommodated inside the body portion 20 is, the more the projection holding portion 40 is displaced outwardly in the radial direction of the body portion 20 and cuts into the reinforcing member 26. That is, it becomes harder for the mouth piece 30 to be displaced outwardly in the axial direction in proportion to the pressure of the fluid accommodated inside the body portion 20, so that a fluid with a higher pressure can be accommodated inside the body portion 20.

Thus, one pressure vessel 12 is formed such that the mouth pieces 30 are respectively connected to the openings 22 on the opposite ends of the body portion 20 in the axial direction.

A second step is a step of connecting, to each other, respective mouth pieces 30 of the pressure vessels 12 placed in parallel. More specifically, the mouth piece 30 of an adjacent pressure vessel 12 is connected to the mouth piece 30 of one pressure vessel 12. Further more specifically, the nut 52 of the adjacent pressure vessel 12 is fastened to the tube portion 36 of the one pressure vessel 12. That is, adjacent mouth pieces 30 are connected by threadedly engaging the external screw thread portion 50 with the internal screw thread portion 54.

Here, in a case where the mouth pieces 30 are simultaneously connected to each other at the both ends of adjacent pressure vessels 12 in the axial direction, if adjacent mouth pieces 30 on a first end of the pressure vessels 12 in the axial direction are connected to each other first, the axes of the adjacent pressure vessels 12 are inclined, thereby making it difficult to connect the mouth pieces 30 on a second end of the pressure vessels 12 in the axial direction. Accordingly, in the case where adjacent pressure vessels 12 (mouth pieces 30) are connected to each other at the opposite ends thereof in the axial direction, the nuts 52 are fastened with the same pitch at the opposite ends in the axial direction. This prevents the axes of the adjacent pressure vessels 12 from being inclined and allows them to be connected easily.

Note that sealing is performed on the penetration passages 48 of the mouth pieces 30 provided on the pressure vessels 12 placed on the outer sides in the vehicle width direction. More specifically, on the tube portion 36 side, a cap 60 (see FIGS. 1A to 1C) is threadedly engaged with the external screw thread portion 50 so that the penetration passage 48 is closed. Meanwhile, on the flange portion 38 side, a plug (not shown) is threadedly engaged with the nut 52 so that the penetration passage 48 is closed.

As described above, the first pressure vessel 12A and the second pressure vessel 12B having different lengths are connected to each other via the mouth piece 62 having the extending portion 62A extending in the axial direction. The tank module 10 is thus manufactured by the second step.

Further, a step of connecting the valve 64 to the tank module 10, a step of placing the tank module 10 on the lower side of the floor panel (not shown) in the vehicle up-down direction, and a step of connecting, to the valve 64, a supply pipe extending from the fuel cell stack are performed. Thus, the fuel system of the fuel cell vehicle is formed.

Modifications

The following describes modifications of the first embodiment. The modifications have the same basic configuration, except how to connect the mouth pieces 30. The following modifications deal with differences from the first embodiment. Further, the same reference sign is given to the same constituent as the first embodiment.

First Modification

Figure 4:
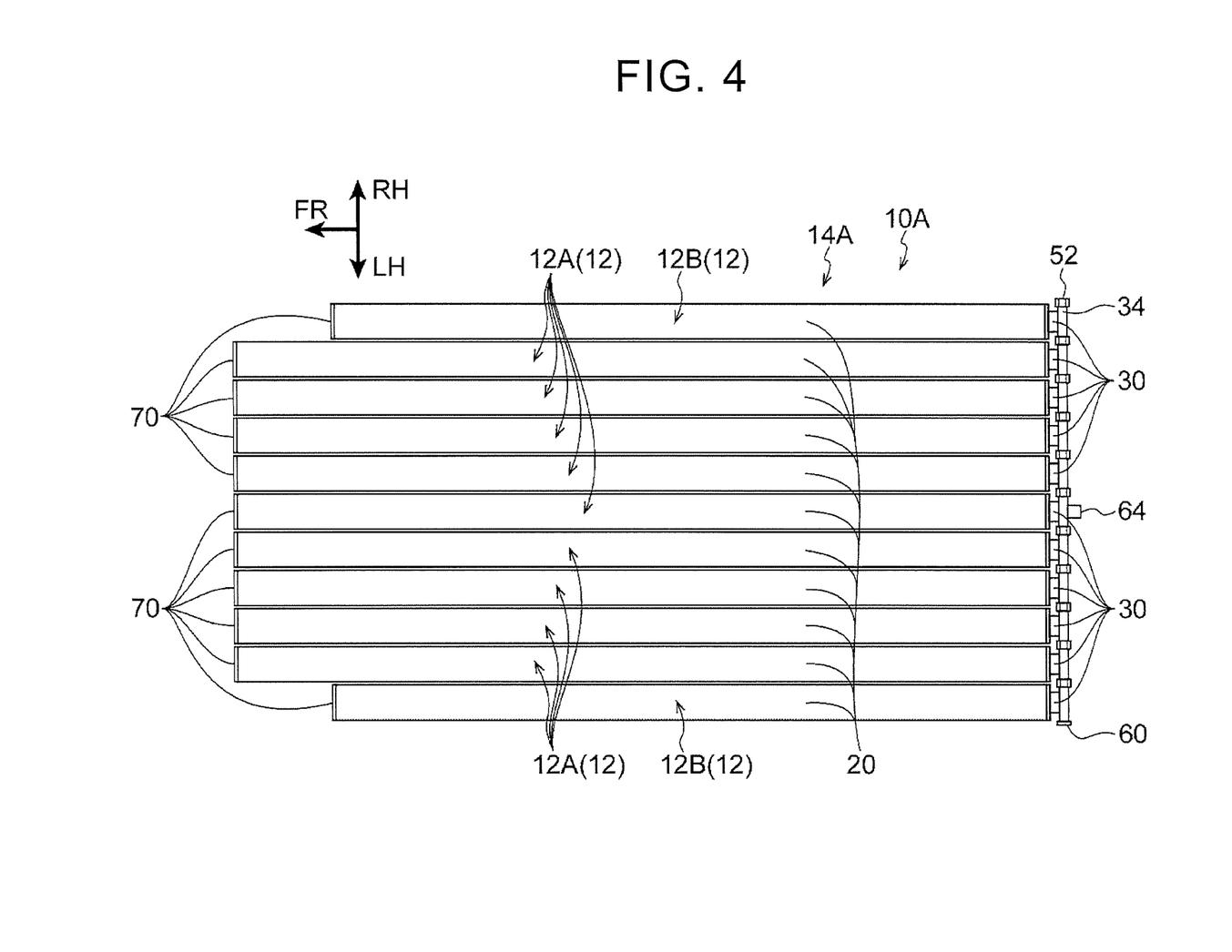
FIG. 4 is a plan view of a tank module according to the first Modification of the first embodiment of the disclosure.

FIG. 4 illustrates the first Modification of the first embodiment. As illustrated in FIG. 4, a tank module 10A to which a connection structure 14A for pressure vessels according to the first Modification is applied is configured such that the mouth piece 30 is provided only in one end of the pressure vessel 12 in the axial direction. In the pressure vessel 12 of the first Modification, the mouth piece 30 is connected to the opening 22 on the rear side in the vehicle front-rear direction, and the opening 22 on the front side in the vehicle front-rear direction is closed by a cover member 70. Although not illustrated particularly, the cover member 70 includes a cover for closing the opening 22. A part inserted into the body portion 20 has the same structure as the insertion portion 32 without the communicating passage 46. The other configuration is the same as in the first embodiment.

The first Modification can be applied to a case where the amount of a fluid flowing out through the communicating passage 46 and the penetration passage 48 in the mouth piece 30 is smaller than the demand of the fuel cell. That is, in the first Modification, the number of mouth pieces 30 can be reduced in comparison with the first embodiment, thereby making it possible to restrain the cost.

Second Modification

Figure 5:
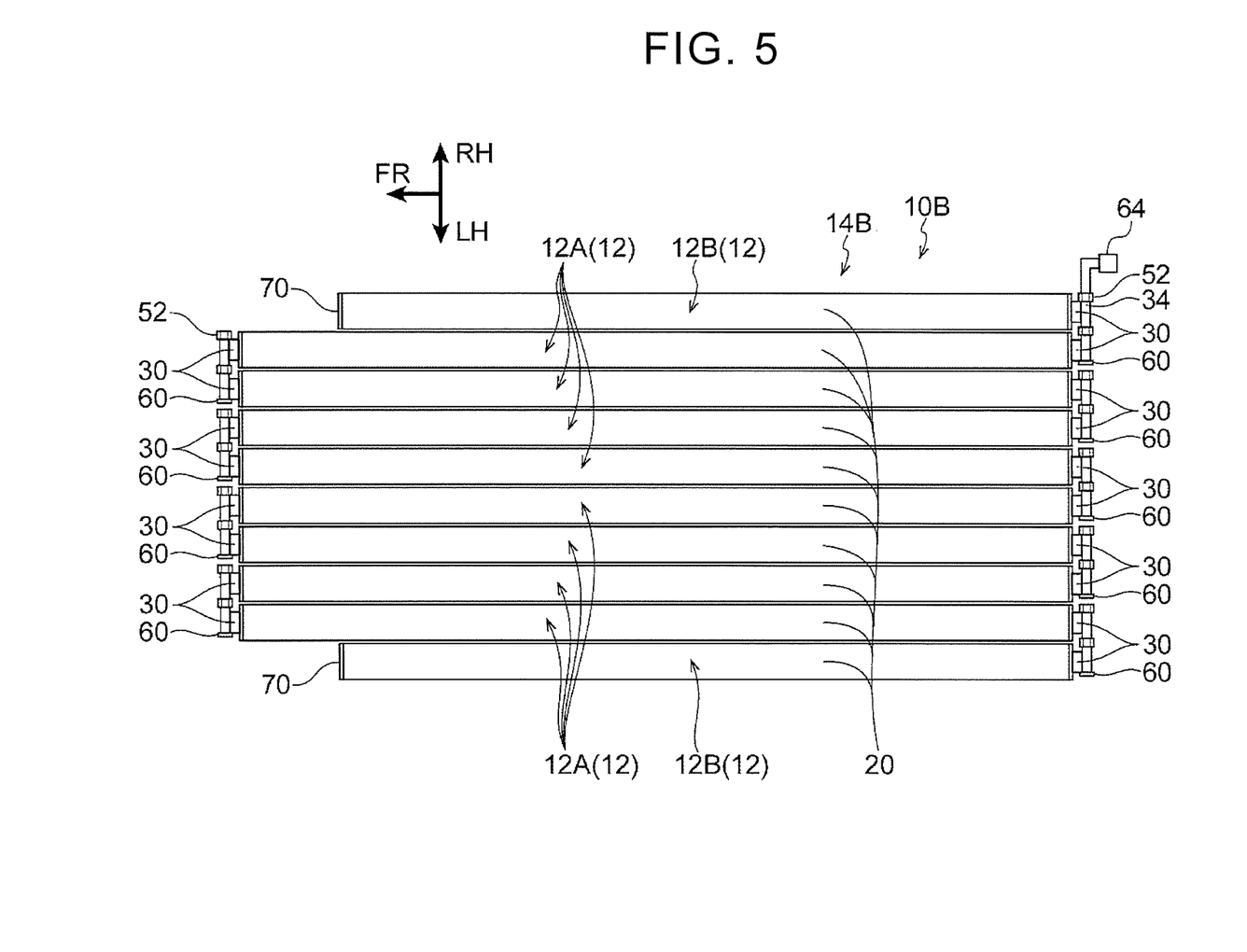
FIG. 5 is a plan view of a tank module according to the second Modification of the first embodiment of the disclosure.

FIG. 5 illustrates the second Modification of the first embodiment. As illustrated in FIG. 5, a tank module 10B to which a connection structure 14B for pressure vessels according to the second Modification is applied is configured such that the pressure vessels 12 placed in parallel are connected in series. The tank module 10B of the second Modification is constituted by eight first pressure vessels 12A placed in parallel on the inner side in the vehicle width direction, and second pressure vessels 12B placed outward of the first pressure vessels 12A in the vehicle width direction. Here, in the second Modification, three or more mouth pieces 30 are not connected consecutively. More specifically, in terms of the first and second ones out of the pressure vessels 12 from the outer side in the vehicle width direction, their mouth pieces 30 on the rear side in the vehicle front-rear direction are connected to each other. In terms of the second and third ones out of the pressure vessels 12 from the outer side in the vehicle width direction, their mouth pieces 30 on the front side in the vehicle front-rear direction are connected to each other. In terms of the third and fourth ones out of the pressure vessels 12 from the outer side in the vehicle width direction, their mouth pieces 30 on the rear side in the vehicle front-rear direction are connected to each other. In terms of the fourth and fifth ones out of the pressure vessels 12 from the outer side in the vehicle width direction, their mouth pieces 30 on the front side in the vehicle front-rear direction are connected to each other. In terms of the pressure vessels 12 in the center in the vehicle width direction (the fifth ones out of the pressure vessels 12 from the opposite sides in the vehicle width direction), their mouth pieces 30 on the rear side in the vehicle front-rear direction are connected to each other.

Note that the opening 22 of the second pressure vessel 12B on the front side in the vehicle front-rear direction is closed by the cover member 70. Further, in the second Modification, the valve 64 is connected to the mouth piece of the second pressure vessel 12B on the right side in the vehicle width direction.

Thus, with the connection structure 14B for pressure vessels in the second Modification, it is possible to connect the pressure vessels 12 in series.

Third Modification

Figure 6:
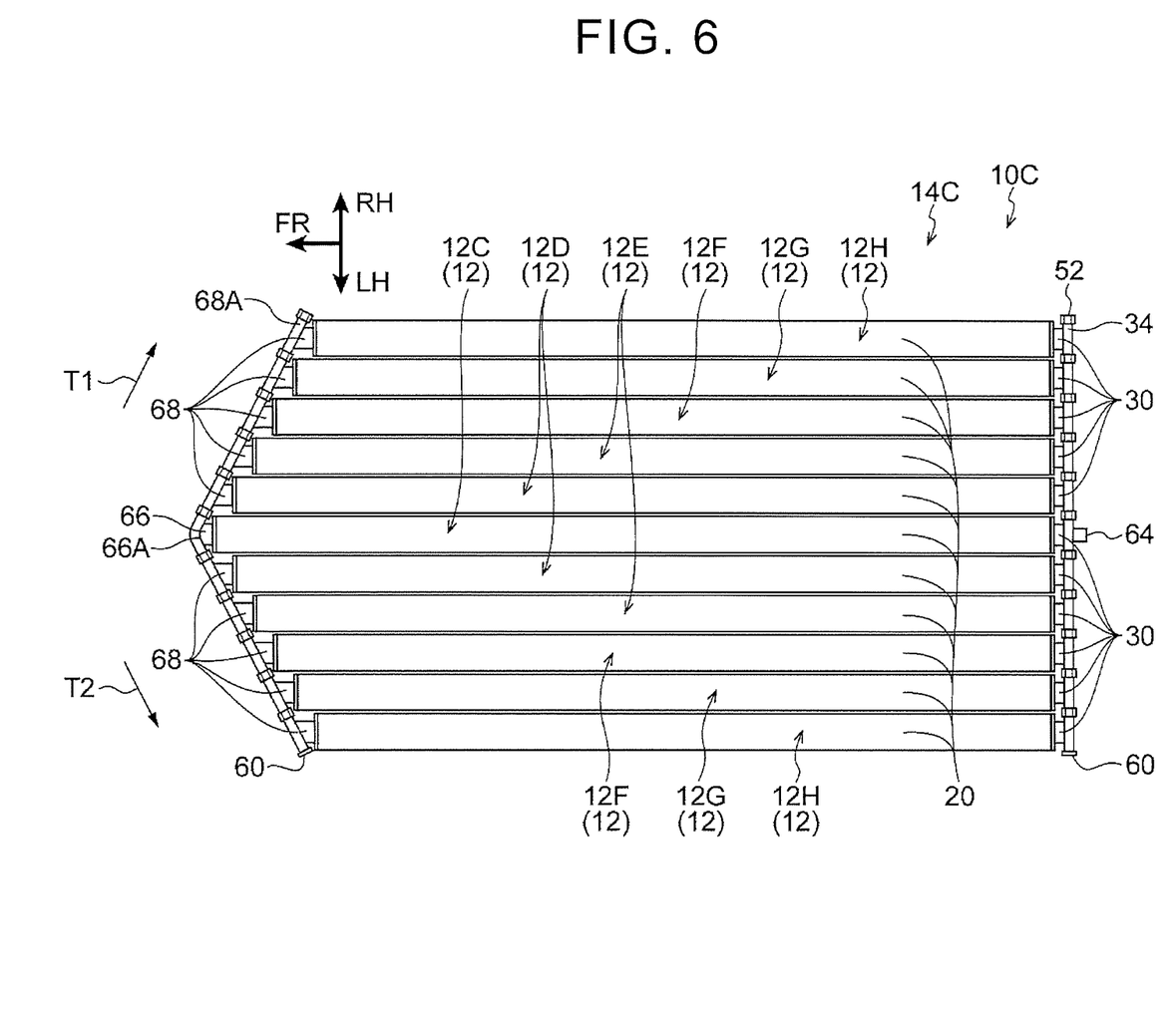
FIG. 6 is a plan view of a tank module according to the third Modification of the first embodiment of the disclosure.

FIG. 6 illustrates the third Modification of the first embodiment. As illustrated in FIG. 6, a tank module 10C to which a connection structure 14C for pressure vessels according to the third Modification is applied is configured such that the pressure vessels 12 placed in parallel are connected to each other at the opposite ends thereof in the axial direction. The tank module 10C of the third Modification is constituted by the pressure vessels 12 (a first pressure vessel 12C, second pressure vessels 12D, third pressure vessels 12E, fourth pressure vessels 12F, fifth pressure vessels 12G, and sixth pressure vessels 12H) placed such that the axial length increases from the outer side in the vehicle width direction toward the inner side in the vehicle width direction. That is, the first pressure vessel 12C in the center in the vehicle width direction is longer than its adjacent second pressure vessel 12D, the second pressure vessel 12D is longer than its adjacent third pressure vessel 12E, and the third pressure vessel 12E is longer than its adjacent fourth pressure vessel 12F. Further, the fourth pressure vessel 12F is longer than its adjacent fifth pressure vessel 12G, and the fifth pressure vessel 12G is longer than its adjacent sixth pressure vessel 12H placed on the outer side in the vehicle width direction. In the third Modification, a difference in length between any adjacent pressure vessels 12 is the same. That is, as illustrated in FIG. 6, in the state where the positions of the rear ends of the pressure vessels 12 in the vehicle front-rear direction are aligned with each other, their front ends in the vehicle front-rear direction are arranged in directions (see inclination directions T1, T2) inclined rearward in the vehicle front-rear direction from the inner side in the vehicle width direction toward the outer sides in the vehicle width direction.

Here, a mouth piece 66 having a connecting portion 66A configured such that its first end in the vehicle width direction extends along the inclination direction T1 and its second end extends along the inclination direction T2 is connected to the opening 22 of the first pressure vessel 12C on the front side in the vehicle front-rear direction. Further, respective mouth pieces 68 each having a connecting portion 68A extending along the inclination direction T1 or the inclination direction T2 are connected to the openings 22, on the front side in the vehicle front-rear direction, of the second pressure vessels 12D, the third pressure vessels 12E, the fourth pressure vessels 12F, the fifth pressure vessels 12G, and the sixth pressure vessels 12H. Note that the mouth piece 68 provided in the sixth pressure vessel 12H is configured such that the penetration passage 48 is closed by the cap 60 or a plug (not shown).

Thus, in the connection structure 14C for pressure vessels in the third Modification, the pressure vessels 12 can be connected to each other by the mouth pieces 68 provided along the directions (the inclination directions T1, T2) diagonal to the axial direction of the pressure vessels 12.

Conclusion

The features and effects of the present embodiment are summarized as follows.

A first feature is that the mouth piece 30 connected to the opening 22 of the body portion 20 includes the connecting portion 34 connectable to its adjacent mouth piece 30 in an intersection direction intersecting with the axial direction. The connecting portion 34 includes: the external screw thread portion 50 formed in the tube portion 36 as the outer wall portion for the penetration passage 48 of a first one of adjacent mouth pieces 30; and the nut 52 rotatably locked to the flange portion 38 as the outer wall portion for the penetration passage 48 of a second one of the adjacent mouth pieces 30, the nut 52 having the internal screw thread portion 54 threadedly engageable with the external screw thread portion 50. One pressure vessel 12 is configured such that the nut 52 of its adjacent pressure vessel 12 is fastened to the tube portion 36 provided in the mouth piece 30 of the one pressure vessel 12. That is, adjacent mouth pieces 30 are connected such that the external screw thread portion 50 of a first one of the adjacent mouth pieces 30 is threadedly engaged with the internal screw thread portion 54 formed in the nut 52 of a second one of the adjacent mouth pieces 30. Hereby, adjacent pressure vessels 12 are connected to each other and the penetration passages 48 of the adjacent pressure vessels 12 are connected to each other (see FIG. 3).

With the first feature, the following effect can be obtained in comparison with a case where pressure vessels are connected to a manifold formed integrally as described in JP 2001-506737 A. That is, in the case where the pressure vessels are connected via the manifold, as the number of pressure vessels to be placed in parallel is increased, the manifold is increased in size and becomes complicated. This accordingly increases manufacturing cost. In contrast, with the first feature, when the mouth pieces 30 of the same type are prepared, it is possible to deal with increase and decrease in the number of pressure vessels 12 to be placed. That is, the manufacturing cost can be restrained in comparison with the case of the connection via the manifold.

Further, the nut 52 is formed so as to be rotatable independently from the connecting portion 34 of the mouth piece 30. Here, in a case where an internal screw thread portion fixed to the flange portion 38 side is provided in the connecting portion 34, it is necessary to fix a first one of adjacent pressure vessels 12 and to rotate a second one of the adjacent pressure vessels 12 around the axis along the penetration passage 48 in order that the internal screw thread portion is threadedly engaged with the external screw thread portion 50 of the tube portion 36 so as to be fastened thereto. Accordingly, it is difficult to place the adjacent pressure vessels 12 in parallel to each other at the end of the fastening. In contrast, in the present embodiment having the first feature, at the time of fastening the nut 52 to the tube portion 36, it is possible to adjust an attachment angle (an angle around the vehicle width direction) between the pressure vessels 12 placed in parallel. For example, in a case where the pressure vessels 12 configured such that the mouth pieces 30 are provided only on one side, in the axial direction, of the body portion of the pressure vessels 12 are placed in parallel to each other as described in the first Modification, it is possible to eliminate an error in attachment angle between the pressure vessels 12. That is, it is possible to restrain a deviation on the cover member 70 side between adjacent pressure vessels 12.

Further, in the first embodiment and the first and second Modifications, the mouth piece 30 includes the connecting portion 34 extending in the vehicle width direction. That is, when the vehicle width direction is along an intersection direction intersecting with the axial direction of the pressure vessel 12 and adjacent mouth pieces 30 are connected to each other, the mouth pieces 30 are aligned along the vehicle width direction (see FIGS. 1A to 1C, FIG. 4, and FIG. 5). In the meantime, in the third Modification, the mouth piece 68 includes the connecting portion 68A extending along the inclination direction T1 or the inclination direction T2. That is, when the inclination direction is along an intersection direction intersecting with the axial direction of the pressure vessel 12 and adjacent mouth pieces 68 are connected to each other, the mouth pieces 68 are aligned along the inclination direction T1 or the inclination direction T2 (see FIG. 6). Thus, in the present embodiment and its modifications, the pressure vessels 12 thus placed in parallel can be connected to each other along a vertical direction (the vehicle width direction) or a diagonal direction (the inclination directions T1, T2) to the axial direction of the pressure vessels 12.

A second feature is that the mouth pieces 30 are provided in the opposite ends of the body portion 20 in the axial direction. In the present embodiment, since the mouth pieces 30 are provided in the opposite ends in the axial direction, adjacent mouth pieces 30 are connected to each other at the opposite ends of the pressure vessels 12 in the axial direction. Hereby, adjacent pressure vessels 12 are connected to each other at their opposite ends in the axial direction, and the penetration passages 48 of the adjacent pressure vessels 12 are connected to each other at their opposite ends in the axial direction. That is, with the second feature, it is possible to efficiently connect adjacent pressure vessels 12 to each other and perform piping, in addition to the effect of the first feature.

Further, as described above, in a case where an internal screw thread portion fixed to the flange portion 38 side is provided in the connecting portion 34, it is necessary to fix a first one of adjacent pressure vessels 12 and to rotate a second one of the adjacent pressure vessels 12 around the axis along the penetration passage 48 in order that the internal screw thread portion is threadedly engaged with the external screw thread portion 50 of the tube portion 36 so as to be fastened thereto. On this account, it is difficult to connect adjacent mouth pieces 30 to each other at the same time at the opposite ends of the pressure vessels 12 in the axial direction. In contrast, in the present embodiment having the second feature, the nut 52 is formed so as to be rotatable independently from the connecting portion 34 of the mouth piece 30. Accordingly, it is possible to connect adjacent mouth pieces 30 to each other at the same time at the opposite ends of the pressure vessels 12 in the axial direction.

Note that, like the third Modification of the present embodiment, in a case where the lengths of the pressure vessels 12 are changed at a given ratio, it is possible to connect adjacent pressure vessels 12 at the opposite ends of the pressure vessels 12 in the axial direction with the use of the mouth piece 30 and the mouth piece 68 including the connecting portion 68A inclined along a diagonal direction (the inclination directions T1, T2). Further, even in the case of the pressure vessels 12 having the same length, when the mouth pieces 68 are provided at the opposite ends of the pressure vessels 12 in the axial direction, it is possible to form a tank module projecting forward in the vehicle front-rear direction toward the inner side in the vehicle width direction, for example.

A third feature is that the O-ring 56 is provided on an end surface (the end surface of the connecting portion 34 on one side) of a first one of the mouth pieces 30 of adjacent pressure vessels 12 so as to surround the penetration passage 48, and the O-ring 56 is brought into contact with an end surface of a second one of the mouth pieces 30 at a position surrounding the penetration passage 48. In the present embodiment, the O-ring 56 is provided on the end surface on the flange portion 38 side so as to surround the penetration passage 48, and the abutment portion 36A with which the O-ring 56 abuts is provided on the end surface on the tube portion 36 side. With the third feature, it is possible to adjust the angle around the vehicle width direction at the time when the pressure vessels 12 are connected and to secure the airtightness between the connecting portions of the pressure vessels 12.

A fourth feature is that the mouth pieces 30 of the pressure vessels 12 placed in parallel are connected to each other continuously in the tank module 10. In a case where a plurality of pressure vessels is placed such that the pressure vessels are connected to each other, if valves and pipes are provided to the pressure vessels, the structure becomes complicated and the cost increases. In contrast, with the fourth feature, it is possible to perform assembling and piping of the tank module 10 such that the pressure vessels 12 are connected to each other without using a large and complicated component such as a manifold.

A fifth feature is that the manufacturing method of the tank module 10 includes a step of connecting the mouth pieces 30 to the openings 22 of the body portion 20, that is, a first step of forming the pressure vessel 12, and a second step of connecting, to each other, respective mouth pieces 30 of the pressure vessels 12 placed in parallel. When the fifth feature is applied to the manufacturing method of the tank module 10, the pressure vessels 12 formed in advance can be stocked in the first step, and then, a necessary number of pressure vessels 12 for the tank module 10 can be connected to each other in the second step. That is, it is possible to deal with manufacture of a plurality of tank modules 10 with different number of pressure vessels 12 and different arrangements thereof.

Second Embodiment

A connection structure 14D for pressure vessels according to the second embodiment will be described with reference to FIG. 7. A tank module 10D to which the connection structure 14D for pressure vessels according to the second embodiment is applied is different from the first embodiment in shape of the end of the connecting portion 34. The following describes differences from the first embodiment. Note that the same reference sign is given to the same constituent as the first embodiment.

Figure 7:
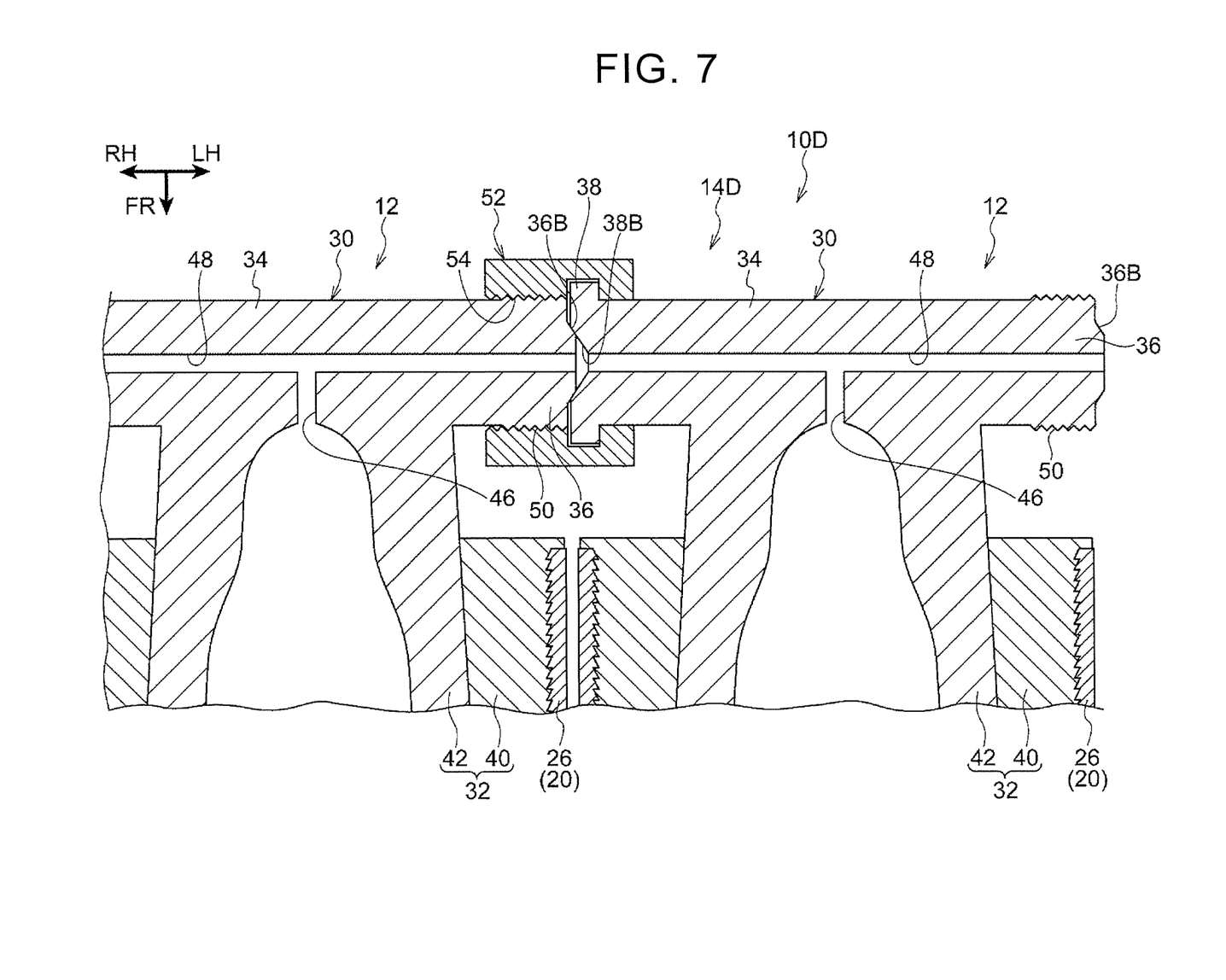
FIG. 7 is a sectional view illustrating a state where adjacent mouth pieces are connected to each other in a connection structure for pressure vessels according to a second embodiment of the disclosure.

As illustrated in FIG. 7, the connecting portion 34 includes: a first tapered surface 36B formed around the penetration passage 48 on an end surface (an end surface on one side) of a first one of the mouth pieces 30 of adjacent pressure vessels 12; and a second tapered surface 38B formed around the penetration passage 48 on an end surface of a second one of the mouth pieces 30 and abutting with the first tapered surface 36B. More specifically, the first tapered surface 36B is formed as a conical surface of a trapezoidal cone shaped projecting portion provided on the end surface of the tube portion 36. Further, the second tapered surface 38B is formed as an inclined surface of a trapezoidal cone shaped recess provided on the end surface of the flange portion 38. Note that the first tapered surface may be formed as an inclined surface of a trapezoidal cone shaped recess provided on the end surface of the tube portion 36, and the second tapered surface may be formed as a conical surface of a trapezoidal cone shaped projecting portion provided on the end surface of the flange portion 38.

In the present embodiment, like the third feature of the first embodiment described above, it is possible to adjust the angle around the vehicle width direction at the time when the pressure vessels 12 are connected to each other and to secure the airtightness between the connecting portions of the pressure vessels 12. Further, within a range where the first tapered surface 36B abuts with the second tapered surface 38B, a deviation (a deviation in degree of parallelization) of the angle between respective axial directions of adjacent pressure vessels 12 can be permitted. Further, in the second embodiment, it is possible to secure the airtightness when the first tapered surface 36B makes contact with the second tapered surface 38B without any gap around the penetration passage 48, so that the O-ring 56 as the sealing member is not required. Accordingly, in the present embodiment, since the O-ring 56 is not required, it is possible to simplify the structure and to restrain the cost.

Remarks

In each of the above embodiments, the serrate portion 40C of the projection holding portion 40 is configured such that its axial outer surface is perpendicular to the axial direction and its axial inner surface is inclined radially inwardly as it goes inwardly in the axial direction (see FIGS. 2 and 3), but the disclosure is not limited to this. For example, the axial outer surface may not be perpendicular to the axial direction and may be inclined radially inwardly as it goes outwardly in the axial direction. Further, instead of the serrate portion 40C, projections having other shapes may be formed in the projection holding portion 40.

Further, the liner 24 of each embodiment is made of aluminum alloy. However, the liner 24 is not limited to this, and may be made of a material, such as nylon resin, that restrains permeation of hydrogen inside the liner 24. Further, the pressure vessel 12 is configured such that hydrogen is accommodated therein. However, the pressure vessel 12 is not limited to this, and other gases, liquid such as LPG, or the like, may be accommodated therein.

The embodiments of the disclosure have been described above, but the disclosure is not limited to the above description and may be modified in various ways and performed as long as the modifications are not beyond the gist thereof.

What is claimed is:

1. A connection structure for pressure vessels, the connection structure comprising:
    a first mouth piece connected to at least one end of a tubular first pressure vessel in an axial direction;
    a second mouth piece connected to at least one end of a tubular second pressure vessel in the axial direction; and
    a nut, wherein:
    the first mouth piece includes a first penetration passage extending in an intersection direction intersecting with the axial direction, and a first communicating passage configured to connect the first penetration passage to an inside of a first body portion of the first pressure vessel;
    the second mouth piece includes a second penetration passage extending in the intersection direction intersecting with the axial direction, and a second communicating passage configured to connect the second penetration passage to an inside of a second body portion of the second pressure vessel;
    the first mouth piece includes an external screw thread portion provided on a first outer wall portion of the first penetration passage; and
    the nut is rotatably locked to a second outer wall portion of the second penetration passage of the second mouth piece and is threadedly engaged with the external screw thread portion of the first mouth piece so as to connect the first mouth piece and the second mouth piece to each other in the intersection direction.

2. The connection structure according to claim 1, wherein the first mouth pieces are connected to both ends of the first body portion of the first pressure vessel; and the second mouth pieces are connected to both ends of the second body portion of the second pressure vessel.

3. The connection structure according to claim 1, wherein a sealing member surrounding the first penetration passage is provided on an abutting surface between the first mouth piece and the second mouth piece.

4. The connection structure according to claim 1, wherein the first mouth piece includes a first tapered surface provided around the first penetration passage of the first mouth piece; and the second mouth piece includes a second tapered surface provided around the second penetration passage of the second mouth piece so as to abut with the first tapered surface.

5. A tank module comprising the connection structure according to claim 1, wherein the pressure vessels placed in parallel are connected to each other continuously by the first and second mouth pieces.

6. A manufacturing method of the tank module according to claim 5, the manufacturing method comprising:

a process of connecting the first mouth piece to the first body portion of the first pressure vessel;

a process of connecting the second mouth piece to the second body portion of the second pressure vessel placed in parallel with the first pressure vessel; and a process of connecting the first mouth piece to the second mouth piece.

\* \* \* \* \*